United States Patent
Nakatsu et al.

(10) Patent No.: US 6,873,240 B2
(45) Date of Patent: Mar. 29, 2005

(54) POWER CONVERTER

(75) Inventors: Kinya Nakatsu, Hitachi (JP); Satoshi Ibori, Yachimata (JP); Masayuki Hirota, Narashino (JP); Tooru Nakajima, Narashino (JP)

(73) Assignees: Hitachi, Ltd., Tokyo (JP); Hitachi Industrial Equipment Systems Co., Ltd., Chiba (JP)

( * ) Notice: Subject to any disclaimer, the term of this patent is extended or adjusted under 35 U.S.C. 154(b) by 210 days.

(21) Appl. No.: 10/223,684

(22) Filed: Aug. 20, 2002

(65) Prior Publication Data

US 2003/0038699 A1 Feb. 27, 2003

(30) Foreign Application Priority Data

Aug. 21, 2001 (JP) ........................................ 2001-249734

(51) Int. Cl.[7] ................................................. H01F 5/00
(52) U.S. Cl. ...................................................... 336/200
(58) Field of Search .............................. 336/65, 69, 83, 336/200, 205–208, 220–223, 232; 361/268–270, 277–278; 333/116, 184, 185, 202

(56) References Cited

U.S. PATENT DOCUMENTS 5,153,812 A * 10/1992 Naito ......................... 361/270

FOREIGN PATENT DOCUMENTS

| GB | 2250392 | * | 6/1992 |
| JP | 03-087008 | * | 4/1991 |
| JP | 03-156907 | * | 7/1991 |
| JP | 04-199502 | * | 7/1992 |
| JP | 6-224045 | | 8/1994 |
| JP | 2000-60407 | | 2/2000 |

* cited by examiner

Primary Examiner—Tuyen T. Nguyen
(74) Attorney, Agent, or Firm—Crowell & Moring LLP

(57) ABSTRACT

A low noise, compact and low cost electric power converter employing a compact common mode transformer, and incorporating a line filter can reduce a leakage current, and can maintain predetermined leakage current reduction effect even if installation condition of the electric power converter or a characteristics of a semiconductor switching element is varied. The electric power converter including a capacitor, a first electrode, a second electrode, a first magnetic body, on which the first electrode and the second electrode are wound to form an LC composite element, connecting electrodes electrically connected to respective of both ends of the first and second electrodes, a second magnetic body for interlinking both ends of the first magnetic body, a coil wound around the second magnetic body in the same winding direction as the first and second electrodes wound around the first magnetic body and a resistor for shorting the output of the coil.

4 Claims, 12 Drawing Sheets

FIG. 17A
Prior Art
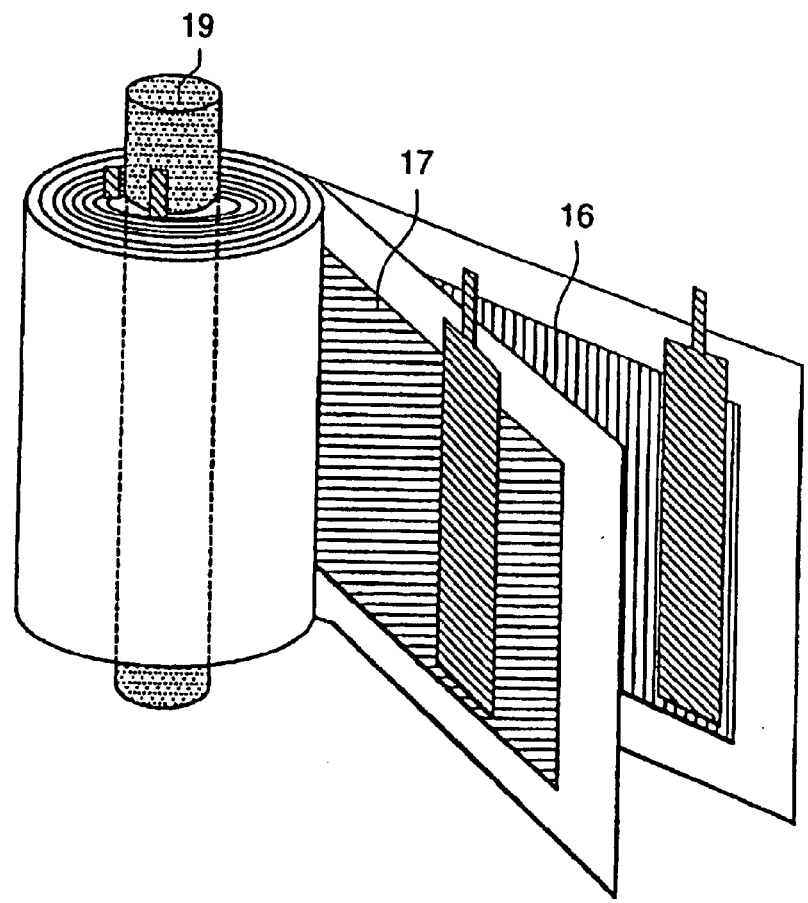
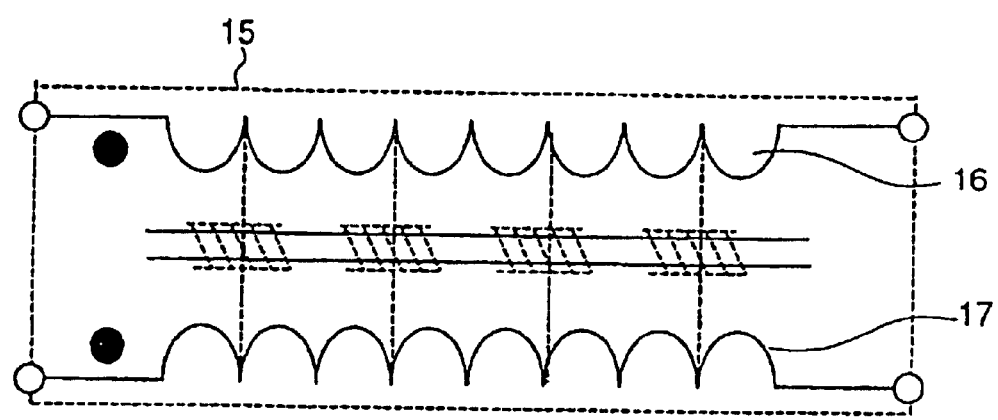
FIG. 17B PRIOR ART

POWER CONVERTER

BACKGROUND OF THE INVENTION

1. Field of the Invention

The present invention relates generally to an electric power converter, such as an inverter unit, a power storage unit and so forth. More particularly, the invention relates to an electric power converter using an LC composite element reducing noise leaking from the electric power converter.

2. Description of the Related Art

An inverter unit has been widely used for operation of an alternating-current motor, such as an induction motor or the like. In the recent years, the inverter unit is also used as a controller for a power source of a vehicle so that a merit of variable speed operation by the inverter unit can be enjoyed satisfactorily.

In control of the conventional inverter unit shown in FIG. 16, PWM (pulse-width modulation) control systems have been widely used conventionally. The PWM control system includes a converter portion (forward converting portion) 2 constituted of a diode rectifier, a PWM control type inverter (reverse converting portion) 3, to which a direct current power output from the converter portion 2 is input, and a smoothing capacitor 4 connected in a direct current portion between the converter portion 2 and the inverter portion 3.

When an alternating-current power is input to the converter portion 2 from a commercial alternating-current source to be the power source, a direct-current power smoothed by the capacitor 4 is supplied to the inverter portion 3. Here, a semiconductor switching element 40 of the inverter portion 3 is PWM controlled to be converted into a predetermined voltage of the direct current power and an alternating current power of a predetermined frequency. As a result, a power of variable voltage and variable frequency is supplied to a load 6, such as induction motor or the like.

At this time, the semiconductor switching element 40 in the inverter portion 3 is controlled ON (conductive) and OFF(non-conductive) according to a PWM signal transmitted from a computer 28 via a driver circuit 43, and outputs a rectangular wave voltage and a load current to the load 6 to cause conduction loss determined by a conduction resistance of the semiconductor switching element 40 and the load current and a switching loss upon occurrence of transitional abnormality of voltage and current upon ON and OFF.

In the recent years, improvement of transient response of the semiconductor switching element 40 has been progressed in order to reduce the switching loss and IGBT (insulated gate bipolar transistor) having high speed switching characteristics has been developed to realize reduction of loss to contribute for down-sizing of the cooler of the device and down-sizing of the electric power converter represented by the inverter.

However, when transient voltage variation of the rectangular wave becomes acute, a current leaking from an earth capacitance 7 of the power cable connecting between an alternating-current motor as representative load 6 and an earth capacitance 7 of a winding of the alternating-current motor (hereinafter referred to as "leakage current") is increased to elevate a peak value of the leakage current 8 in proportion to a rate of variation of the voltage relative to a time to cause high frequency resonation with parasitic inductance 50 of a power line. Also, the leakage current 8 may flows into the commercial alternating-current source 1 through the inverter portion 3 or the inverter 2 to affect to other equipments, such as to cause malfunction. Furthermore, the leakage current and an electromagnetic wave generated by wiring voltage of a leakage current path may penetrate into other equipments or to discharge radiation noise to television and/or radio antennas adjacent to the inverter.

As one example of prior art, the electric power converter employing the converter (forward converting portion) 2 constituted of the diode rectifier has been discussed hereabove. However, even with the electric power converter supplied a direct-current power output from a storage cell, such as a battery or the like, power of variable voltage and variable frequency can be supplied to the load 6, such as a power source of a vehicle, a cooling fan of a cooling device, a pump driving motor for circulating a cooling water, a hydraulic pump driving motor for hydraulic machine, a compressor driving motor for air conditioner and so forth by converting the direct-current power into the alternating-current power with a predetermined voltage and a predetermined frequency by PWM controlling the semiconductor switching element 40 of the inverter portion 3. Even in this case, radiation noise is generated.

Here, in order to preventing the leakage current 8 to be a cause of noise from flowing, a line filter 5 constituted of an X-connection capacitor 52 and a Y-connection capacitor 10 connecting a common mode transformer 9 as passive element connected to the power line shown in FIG. 16, the power line and the ground, is inserted in the input power line of the electric power converter in series with the load 6 or the power source for blocking flow of the high frequency leakage current 8 to the common mode transformation 9. Then, the blocked leakage current 8 flows to the Y-connection capacitor 10 and then fed back to the ground to significantly reduce the leakage current 8 flowing into the input power line, to avoid for other equipment to cause malfunction or the like, to reduce the leakage current 8 and electromagnetic wave generated by wiring voltage of the leakage current path so as not to penetrate into other equipment.

For down-sizing the line filter, there has been proposed the line filter 5 employing an LC composite element 15 disclosed in Japanese Patent Application Laid-Open No. 6-224045. As shown in FIG. 17, an anode 16 and a cathode of the capacitor are wound around a bar shaped magnetic body 19 of ferrite or the like in concentric manner to form the LC composite element 15 with the anode 16 and the cathode 17. The formed LC composite element 15 serves as the common mode transformer in the manner of winding. In order to form the X-connection capacitor 52 and the Y-connection capacitor 10 between the anode 16 and cathode 17, and the ground, third and fourth electrodes are wound together with the anode 16 and the cathode 17 to form the line filter 5 to realize compact and high performance line filter 5 for significantly reducing the leakage current 8 flowing in the input power line, for avoiding adverse effect, such as malfunction in other equipment, for reducing electromagnetic wave to be generated by the leakage current 8 and the wiring voltage of the leakage current path to avoid penetration into other equipment.

On the other hand, a method for damping the leakage current 8 by inserting a resistor 13 in the path to flow the leakage current 8, has been developed and reported in Institute of Electrical Engineers, 1995 Industrial Application Department National Convention No. 93 "High Frequency Leakage Current Restriction Effect and Designing Method using Common Mode Transformer". In the method, the same phase winding to be zero-phase coil 26 is newly added to the common mode transformer 9 is inserted in the power line in series (hereinafter, the common mode transformer added the same phase winding will be referred to as CMT) for linking magnetic flux generated in a core portion of the common mode transformer 9 by the leakage current flowing through the power line to the newly added zero-phase coil 26 to short the output of the zero-phase coil 26 by a resistor 13. Thus, common mode current, namely the leakage current 8 flows through the resistor 13 for damping the leakage current 8 to significantly reduce the leakage current flowing through the power line to prevent adverse effect for other equipment, such as causing malfunction, to reduce the leakage current and electromagnetic wave generated by the wiring voltage of the leakage current path to avoid penetration into other equipment.

Conventionally, flow of the leakage current 8 to be a cause of noise is restricted using the line filter 5 constructed with the common mode transformer 9 connected to the power line, and the capacitors 10, 52 connected between the power line and the ground. In such case, the common mode transformer 9 to be used for the line filter 5 has to be provided a relatively large inductance characteristics in the extent of several mH. It is further required to accurately wind electrical conductor for a several turns on a magnetic core per each phase and an electrical conductor having relatively large diameter flowing the load current to the wound conductor. Therefore, size of the common mode transformer 9 becomes large and size of the line filter 5 becomes large. In case of the electric power converter having output of several kW, the line filter 5 becomes a size comparable with the electric power converter in such a manner that the line filter 5 has to be constructed in a casing separated from a casing of the electric power converter to encounter the problem of make the electric power converter bulky and high cost of the line filter 5.

Furthermore, in case of the line filter employing the conventional LC composite element 15, it is necessary to make the inductance value for shielding the leakage current 8 large for operation as passive circuit. To attain large inductance value, number of turns in winding the electrodes forming the common mode transformer 9 or, in the alternative, thickness of the magnetic body to be a core, such as ferrite is increased. In the former case, thickness is further increased for increased length of insulation paper. In either case, difficulty is encountered in down-sizing the line filter.

On the other hand, a circuit constants of the line filter 5 and CMT 11 are determined to achieve some reduction effect for the leakage current 8 within a range where installation condition of the electric power converter is determined by safety standard and so forth. Naturally, when one of installation conditions, such as a length of the power cable connecting the electric power converter and the load, characteristics of leakage capacity, is varied, it is possible that the desired reduction characteristics of leakage current 8 cannot be obtained. For instance, when the power cable is provided greater length than the predetermined value, it is possible that the desired reduction characteristics of leakage current 8 cannot be obtained. Particularly, in the line filter 5, when the characteristics of the semiconductor switching element 40 to be used in the electric power converter is varied or when the driver circuit 43 of the semiconductor switching element 40 is varied, a transient output voltage characteristics of the semiconductor switching element 40 becomes different to vary the waveform of the leakage current 8. Also, due to difference of frequency component to be contained in the leakage current, predetermined noise reduction characteristics cannot be obtained by the line filter 5.

Furthermore, in the technology disclosed in Japanese Patent Application Laid-open No. 2000-60407, the common mode current, namely the leakage current 8 can be damped by flowing the leakage current through the resistor 13 by inserting the CMT reported in Institute of Electrical Engineers, 1995 Industrial Application Department National Convention No. 93 "High Frequency Leakage Current Restriction Effect and Designing Method using Common Mode Transformer" between the converter portion as a power input stage of the electric power converter and the inverter portion to be an output stage for supplying the power to the load in parallel to the smoothing capacitor, and whereby can reduce the leakage current flowing through the power line significantly to reduce adverse effect for other equipment possibly cause malfunction. Also, the leakage current 8 and the electromagnetic wave to generate by the wiring voltage of the leakage current path can be reduced to avoid the problem of penetration into other equipment.

SUMMARY OF THE INVENTION

The present invention has been worked out in view of the drawbacks set forth above. Therefore, it is an object of the present invention to provide a low noise, compact and low cost electric power converter employing a compact common mode transformer, and incorporating a line filter which can reduce a leakage current, and can maintain predetermined leakage current reduction effect even if installation condition of the electric power transformer or a characteristics of a semiconductor switching element is varied.

According to the first aspect of the present invention, an electric power converter including a capacitor disposed in a power wiring for supplying an electric power to a load, comprises:

a foil form first electrode fixed on a first insulation sheet;

a foil form second electrode fixed on a second insulation sheet;

a bar-shaped first magnetic body, on which the first electrode with the first insulation sheet and the second electrode with the second insulation sheet are wound in overlapping manner to form an LC composite element;

connecting electrodes electrically connected to respective of both ends of the first and second electrodes;

a second magnetic body having both ends located in contact with or close proximity with both ends of the first magnetic body for interlinking both ends of the first magnetic body;

a coil wound around the second magnetic body in the same winding direction as the first and second electrodes wound around the first magnetic body; and a resistor for shorting the output of the coil.

In the preferred construction, the electric power converter may further comprise:

a both end opened cylindrical casing, in which the LC composite element is disposed;

seal plates formed of insulation material, fixed on both ends of the cylindrical casing for closing the both end opening, and defining through openings, through which the connecting electrode and first magnetic body extend;

the second magnetic body being arranged on outside of the cylindrical casing linking both ends of the first magnetic body and being fixed side surface of the cylindrical casing and the seal plate by a jig or adhesive.

A jig for fixing the second magnetic body and fixing the LC composite element on a wiring board, may be secured on the cylindrical casing or the seal plate.

According to the second aspect of the present invention, an electric power converter including a capacitor disposed in a power wiring for supplying an electric power to a load, comprises:

a foil form first electrode fixed on a first insulation sheet;

a foil form second electrode fixed on a second insulation sheet;

a bar-shaped first magnetic body, on which the first electrode with the first insulation sheet and the second electrode with the second insulation sheet are wound in overlapping manner with placing the first electrode on upper layer to form a first LC composite element;

a bar-shaped third magnetic body, on which the first electrode with the first insulation sheet and the second electrode with the second insulation sheet are wound in overlapping manner in the same winding direction as the first electrode with the first insulation sheet and the second electrode with the second insulation sheet of the first LC composite element, with placing the second electrode on upper layer to form a second LC composite element, the second electrode of the second LC composite element being electrically connected to the second electrode of the first LC composite element for establishing series connection of the first LC composite element and the second LC composite element;

fourth and fifth magnetic bodies having both ends located in contact with or close proximity with both ends of the first and third magnetic bodies for interlinking both ends of the first and third magnetic bodies;

a coil wound around one of the fourth and fifth magnetic bodies in the same winding direction as the first and second electrodes wound around the first magnetic body; and a resistor for shorting the output of the coil.

Preferably, the electric power converter may further comprise:

connecting electrodes electrically connected to respective of both ends of the first and second electrodes of the first and second LC composite elements;

both end opened cylindrical casings, in which the first and second LC composite elements are disposed;

seal plates formed of insulation material, fixed on both ends of the cylindrical casings for closing the both end opening, and defining through openings, through which the connecting electrodes and first and third magnetic bodies extend;

the second magnetic body being arranged on outside of the cylindrical casing linking both ends of the first magnetic body and being fixed side surface of the cylindrical casing and the seal plate by a jig or adhesive.

The output of the coil may be shorted by a variable resistor, and the electric power converter may further comprise means for varying resistance value of the variable resistor for a plurality of times, and measuring voltage at both ends of the variable resistor at every occasion of varying the resistance value, and calculating means for deriving the resistance value of the variable register for minimizing a common mode current flowing through the LC composite element using the detected voltage at the variable resistor. An inverter unit using a pulse width modulation system for converting a direct-current power into an alternating-current power may be secured on a side surface of an electric motor as the load, for integrating the inverter unit with the load, the LC composite element may be used for smoothing the direct-current power of an inverter portion.

An electric power converter mounted on a vehicle and having an inverter unit for driving a motor as a load using a pulse width modulation system for converting a direct-current power into an alternating-current power may include an LC composite element used for smoothing the direct-current power of an inverter portion.

An electric power converter having an inverter unit supplying an electric power to a power source system with converting a direct-current power supplied from a solar cell or a power storage cell using a pulse width modulation system may include an LC composite element used for smoothing the direct-current power of an inverter portion.

In the preferred construction, the first electrode with the first insulation sheet and the second electrode with the second insulation sheet of the LC composite element for smoothing the direct-current power of the inverter unit may be wound to have compressed planular shape in cross section on a plane perpendicular to a winding axis, and the bar-shaped first magnetic body may be inserted in the center portion of the electrode wound into the compressed planular shape. Also, it is possible that regions having mutually different surface roughness may be formed on surfaces of respective anode and cathode of the LC composite element.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIGS. 17A and 17B show constructions of the conventional LC composite circuit and equivalent circuit;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure is not shown in detail in order to avoid unnecessary obscurity of the present invention.

Figure 1:
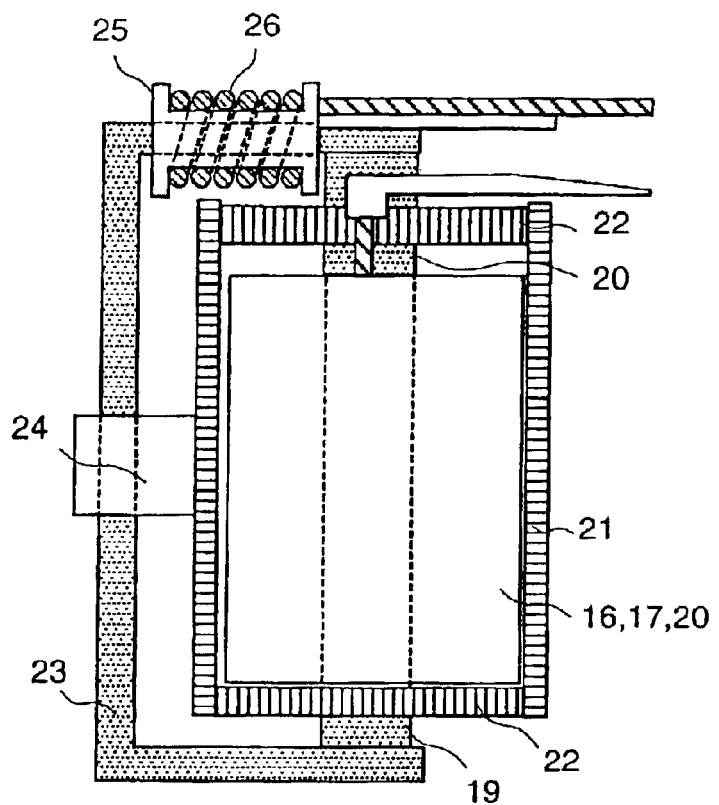
FIG. 1 is a section showing the first embodiment of an LC composite element according to the present invention.
Figure 2:
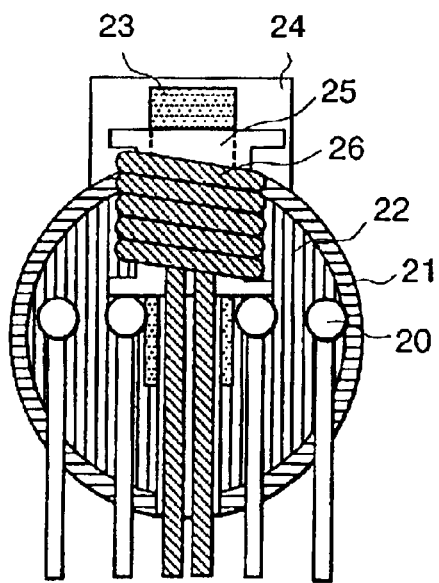
FIG. 2 is a side elevation of the first embodiment of the LC composite element of FIG. 1.
Figure 3:
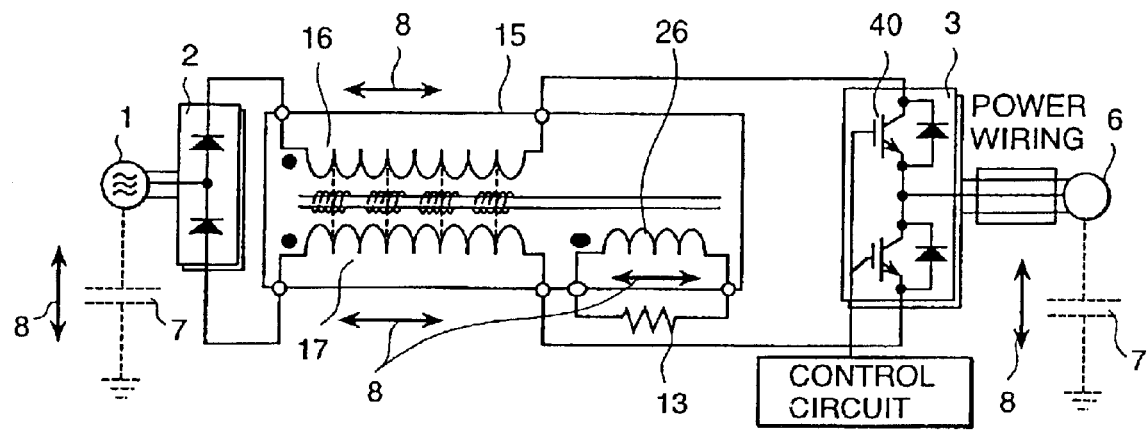
FIG. 3 is a circuit diagram of an electric power converter employing the first embodiment of the LC composite element of FIG. 1.

FIG. 1 is a section showing the first embodiment of an LC composite element according to the present invention, FIG. 2 is a side elevation of the first embodiment of the LC composite element of FIG. 1, and FIG. 3 is a circuit diagram of an electric power converter employing the first embodiment of the LC composite element of FIG. 1. A general construction of the electric power converter has a main circuit including a converter portion 2 constituted of a diode rectifier rectifying a commercial alternating-current power source 1 shown in FIG. 16, a PWM control type inverter portion 3 receiving an input of a direct-current power output from the converter portion 2 and a smoothing capacitor 4 connected to a direct-current portion between the converter portion 2 and the inverter portion 3.

A line filter 5 of the electric power converter used for general purpose is connected to the converter portion 2 on the side of a commercial alternating-current power source 1. A leakage current 8 flowing out from a leakage capacity 7 between an alternating-current motor as a load 6 or a power line of the alternating-current motor and the ground, is blocked from flowing through by rising a high frequency line impedance with a choke coil having superior high frequency characteristics so that the leakage current 8 may not be transmitted toward the commercial alternating-current power source 1. The leakage current 8 is grounded through a Y-connection capacitor 10 connected to the ground in one side and connected to a power line on the other side and having superior frequency response and whereby is prevented from flowing out to the commercial alternating-current power source 1.

On the other hand, the conventional CMT 11 is disposed in the power line between the inverter portion 3 which is PWM controlled so that a sum of output currents IU, IV, IW of a three phase inverter becomes zero, and a load 6, in series. The CMT 11 is formed by winding three power wiring in the same phase and a zero-phase coil 26 on a toroidal core. The output of the zero-phase coil 26 is shorted by a resistor 13. Then, load currents flowing through respective phases form magnetic fluxes which are combined in a magnetic circuit in the toroidal core. However, a sum of the magnetic fluxes generated by IU, IV and IW naturally becomes zero. Therefore, residual magnetic flux in the magnetic circuit is only component generated by the leakage current 8. Thus, a magnetic flux is induced in the zero-phase coil 26 by the leakage current 8. Thus, the leakage current 8 flows through the resistor 13 shorting the output of the zero-phase coil 26. This is equivalent to that the resistor 13 is inserted in the path to flow the leakage current 8 in series. Thus, effect to damp the leakage current 8 by the resistor 13 can be achieved.

Figure 4:
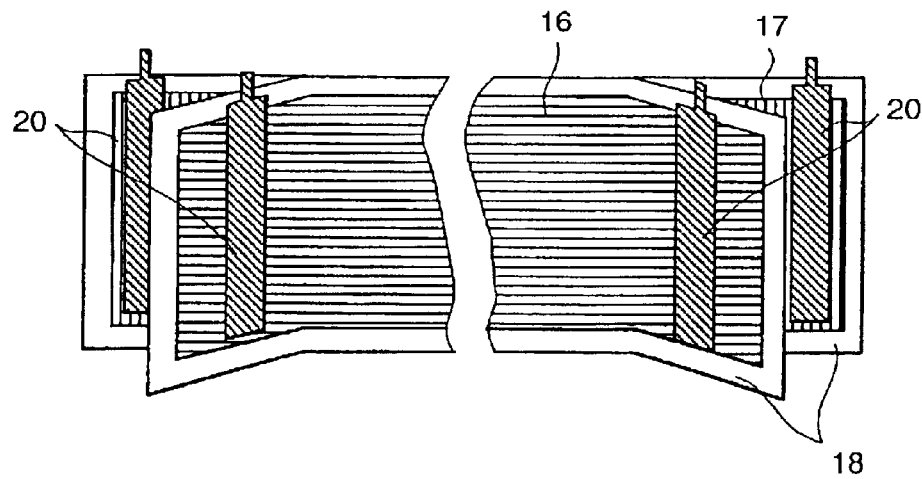
FIG. 4 is a development elevation of an internal electrodes of the first embodiment of the LC composite element of FIG. 1.
Figure 5:
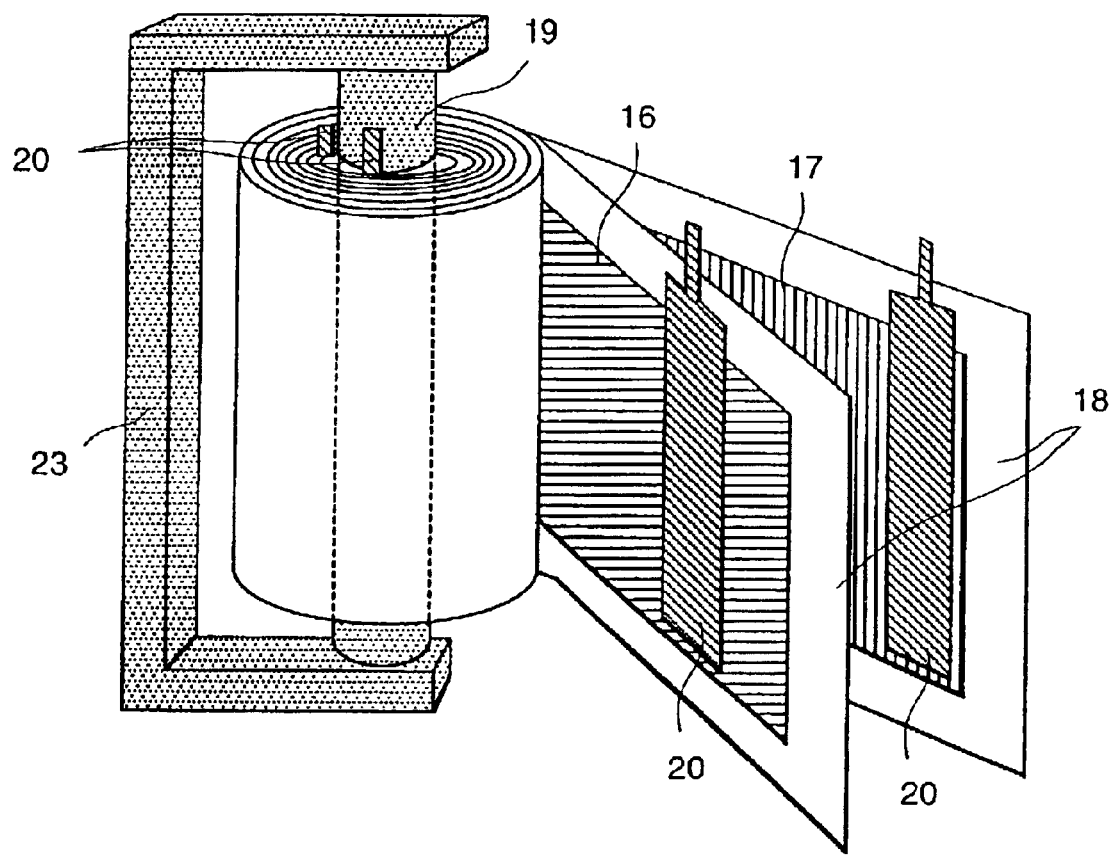
FIG. 5 is a perspective view showing a construction showing the internal electrode of the first embodiment of the LC composite element of FIG. 1.
Figure 6:
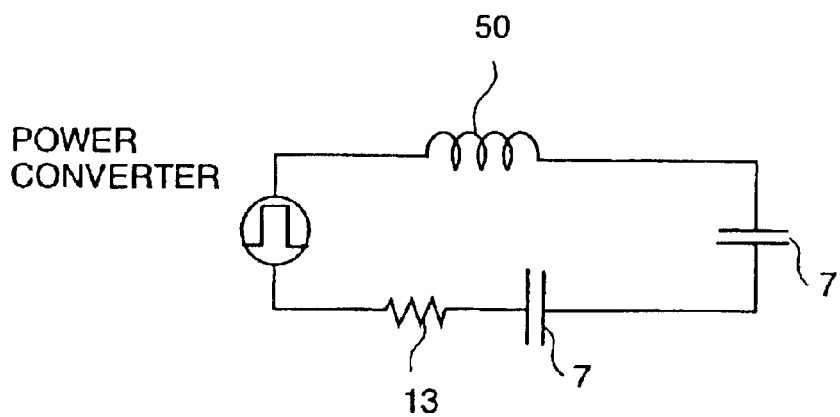
FIG. 6 is a schematic equivalent circuit of a leakage current path of the electric power converter employing the first embodiment of the LC composite element of FIG. 1.
Figure 16:
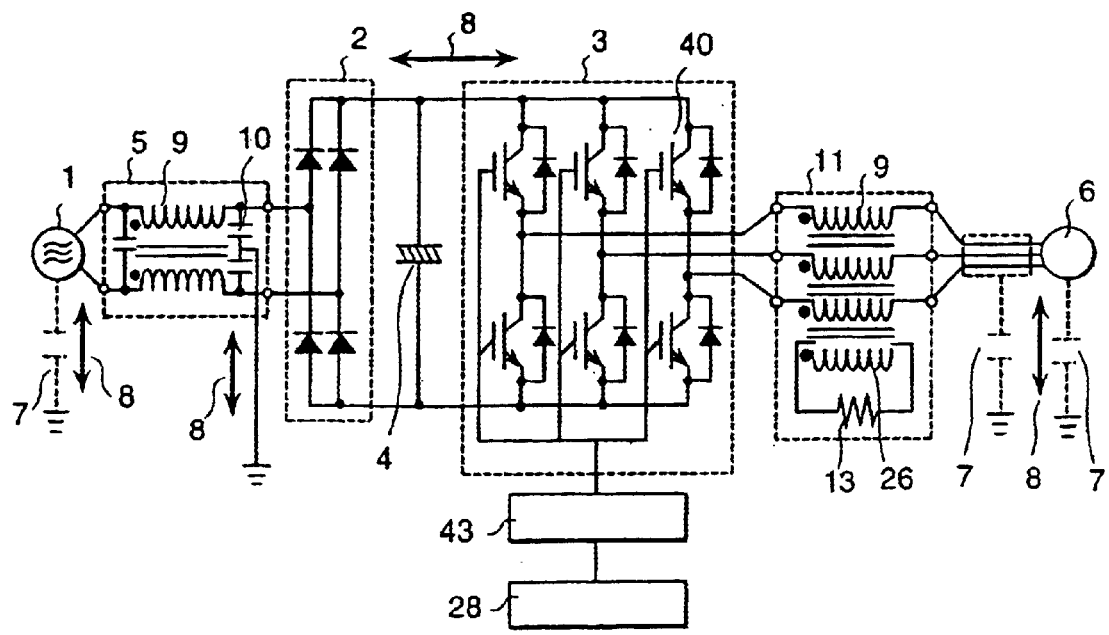
FIG. 16 is a circuit diagram of the electric power converter employing the conventional line filter and CMT.

The first embodiment shown in FIGS. 1, 2 and 3 are differentiated from the prior art shown in FIGS. 16 and 17 in the following points. In the electric power converter employing the inverter portion 3, the converter portion 3 and an LC composite element 15 used as a smoothing capacitor 4 in the power wiring connecting the inverter portion 3, the converter portion 2 and a power storage portion 14, an anode 16 and a cathode 17 are fixed on an insulation paper 18 having dielectric constant at least greater than that of air or an insulation paper 18 wetted by an electrolytic solution, as shown in FIG. 4. The anode 16 and cathode 17 are wound around a bar shaped magnetic body, such as ferrite or the like having length at least greater than a width of the insulation paper 18 in overlapping manner to form a capacitor as shown in FIG. 5. Connection electrodes 20 are fixed on both ends of the anode 16 and the cathode 17 for external electrical connection. The capacitor thus constructed is disposed within a cylindrical casing 21 having opened both ends in a manner shown in FIG. 1. Seal plates 22 formed of resin or the like are fixed at both ends of the cylindrical casing 21. Through holes through which the connection electrode 20 and the bar-shaped magnetic body 19 are extended out of the cylindrical casing 21, are formed in the seal plates 22. In the outside of the cylindrical casing 21, a channel-shaped magnetic body 23 is provided with placing both ends close proximity with both ends of the bar-shaped magnetic body 19 to form a toroidal magnetic circuit. The channel-shaped magnetic body 23 is secured on the side surface of the cylindrical casing 21 by means of a jig or a support member 24. On the channel-shaped magnetic body 23, a coil bobbin 25 is mounted. A third coil to be the zero-phase coil 26 is wound around the coil bobbin 25. The coil bobbin 25 is fixed at a part of the LC composite element 15. An output of the zero-phase coil 26 is shorted by the resistor 13 having a predetermined resistance. Thus, as shown in FIG. 3, the resistor 13 can be inserted in the common mode leakage current 8 flowing across the inverter portion 3, the converter portion 2 and the power storage portion 14 to flow the leakage current 8 through the resistor and whereby to damp the leakage current 8. With the arrangement set forth above, the leakage current 8 flowing through the power line can be reduced to eliminate adverse effect to other equipment which can cause malfunction. Also, electromagnetic wave generated by the leakage current 8 and the wiring voltage of the leakage current path can be reduced. Therefore, the leakage current 8 can be damped without newly using the line filter 5 with built-in common mode transformer 9 to achieve lowering of noise, down-sizing and lowering of cost of the electric power converter.

Figure 7:
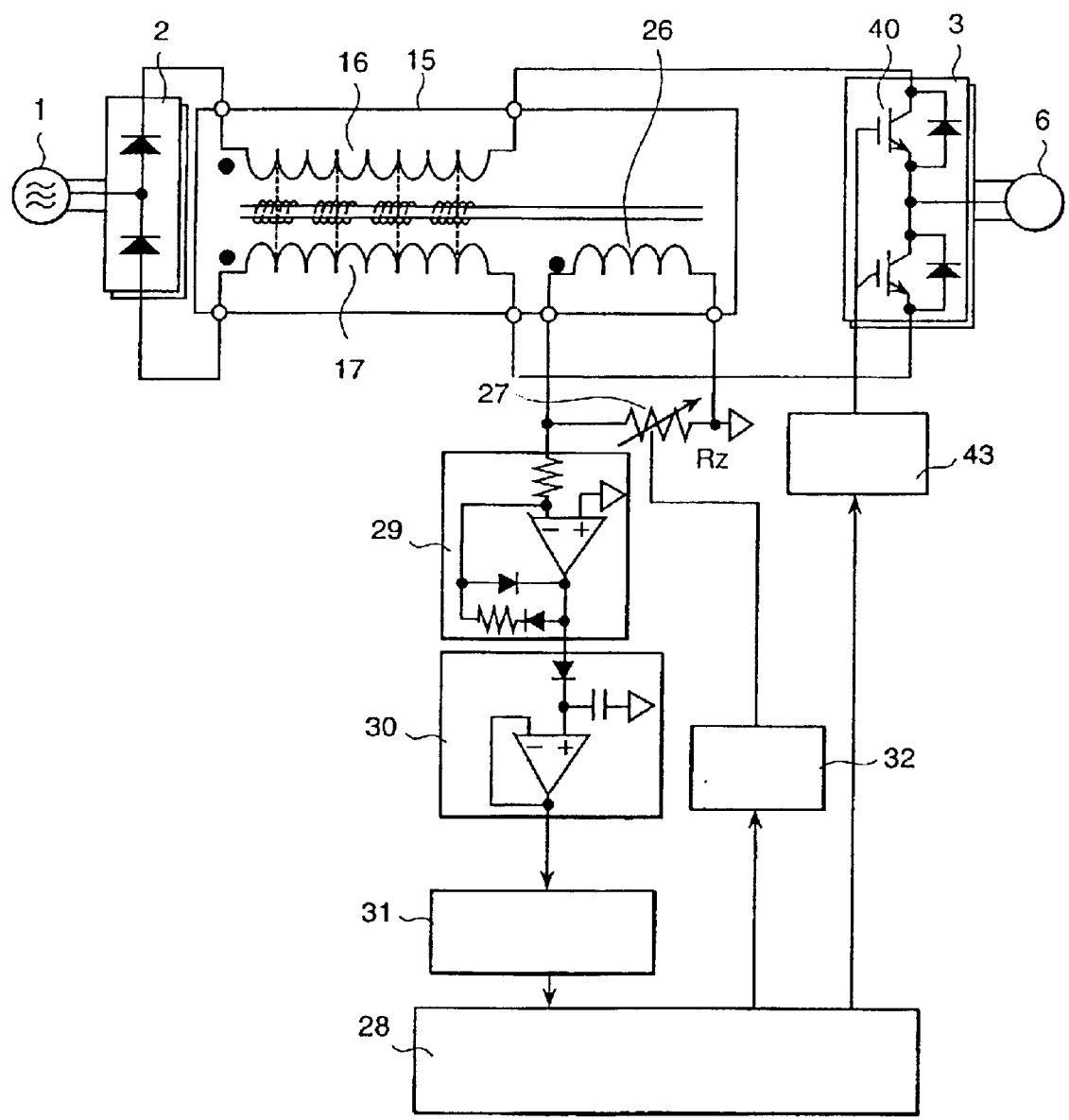
FIG. 7 is a circuit diagram showing the second embodiment of the LC composite element according to the present invention and the electric power converter employing the second embodiment of the LC composite element.
Figure 8:
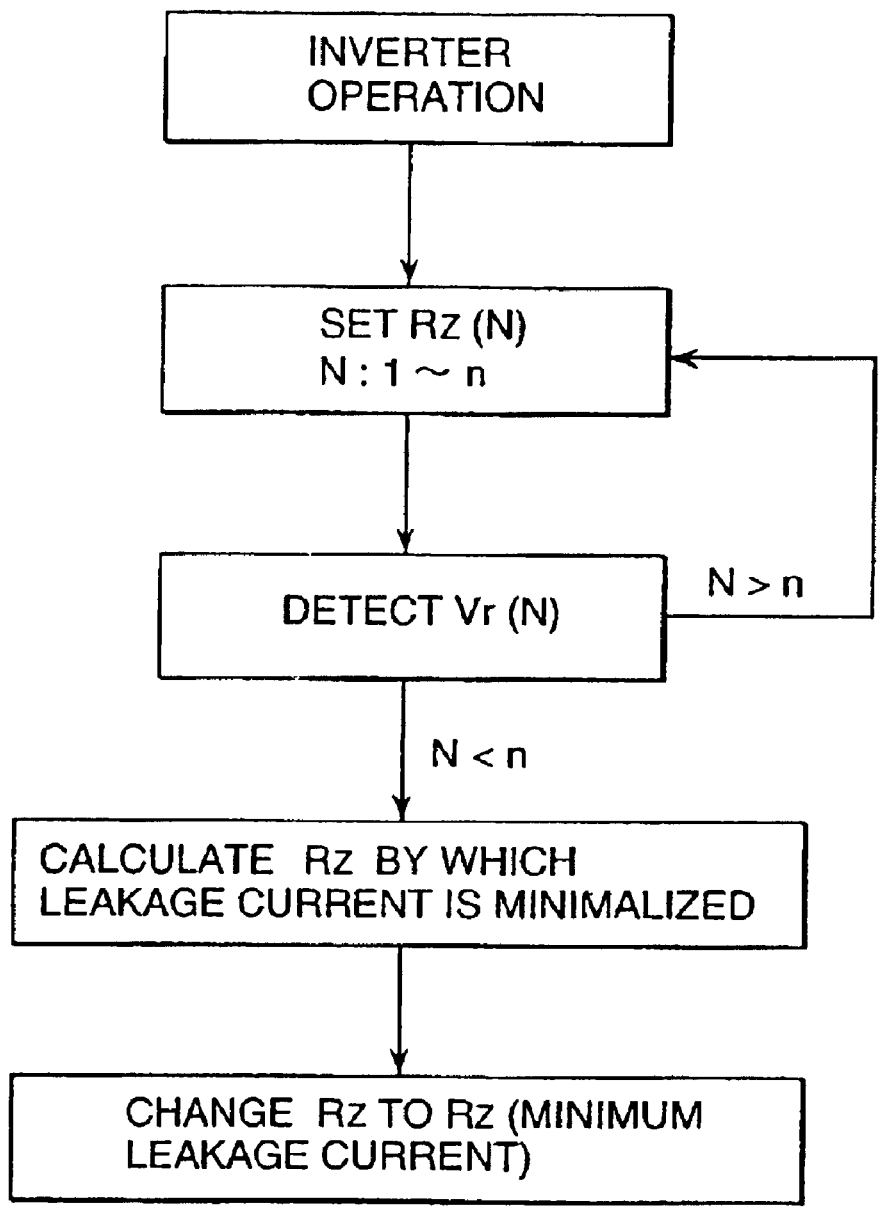
FIG. 8 is a flowchart showing a minimizing process of the leakage current in the electric power converter of the embodiment shown in FIG. 7.

FIG. 7 shows one example of the electric power converter employing the second embodiment of the LC composite element according to the present invention. The shown embodiment is differentiated from the embodiment shown in FIG. 1 in the following points. On the channel-shaped magnetic body 23, the coil bobbin 25 is mounted. The third coil to be the zero-phase coil 26 is wound around the coil bobbin 25. The coil bobbin 25 is fixed at a part of the LC composite element 15. An output of the zero-phase coil 26 is shorted by a variable resistor 27 having a predetermined resistance. Thus, as shown in FIG. 3, the variable resistor 27 can be inserted in the common mode leakage current 8 flowing across the inverter portion 3, the converter portion 2 and the power storage portion 14. Resistance value of the variable resistor 27 is varied for a plurality of times using a computer 28 according to a process illustrated in a flowchart shown in FIG. 8, at each time of varying the resistance value (Rz(N)), a voltage (Vr(N)) at both ends of the variable resistor 27 is measured. In measurement, the voltage at both ends of the resistor is rectified by a half-wave rectifier circuit 29 and held by a peak hold circuit 30 or a sample/hold circuit. The held value is then converted into the digital value from the voltage by an A/D converter 31. On the basis of the converted digital value, the resistance value (Rz) of the variable resistor 27, at which the common mode leakage current 8 becomes minimum, is calculated by the computer 28. On the basis of the result of calculation, the resistance value (Rz) of the variable resistor 27 is set to the determined resistance value by controlling the resistance controller 32 from the computer 28. The leakage current 8 can be damped using the resistor 27 which can minimize the leakage current. By this, irrespective of mounting condition of the electric power converter and the load 6, the leakage current flowing through the power line can be reduced significantly to reduce the leakage current 8 flowing into other equipment via the commercial alternating-current power source 1 and to reduce adverse effect for other equipment to possibly cause malfunction. Also, electromagnetic wave generated by the leakage current 8 and the wiring voltage of the leakage current path can be reduced. Therefore, the leakage current 8 can be damped without newly using the line filter 5 with built-in common mode transformer to achieve lowering of noise, down-sizing and lowering of cost of the electric power converter.

Figure 9:
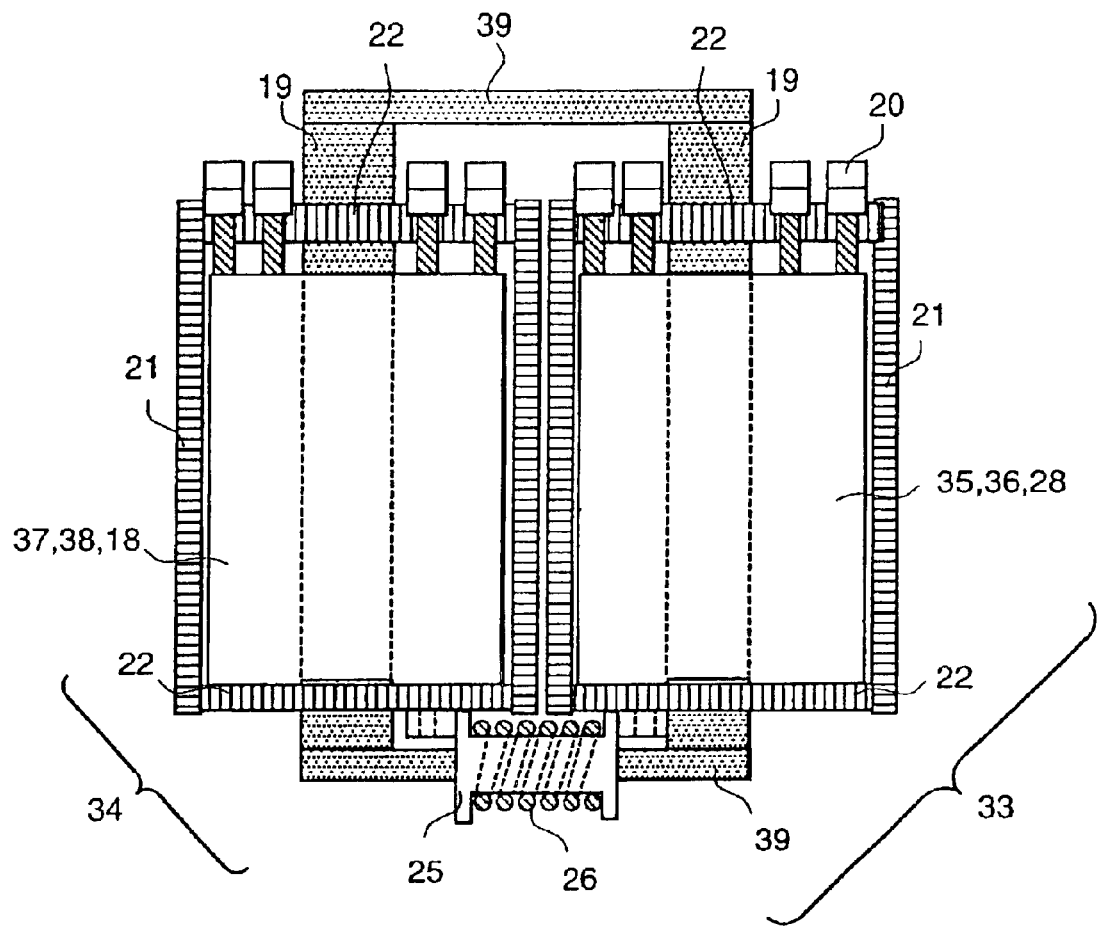
FIG. 9 is a section of the third embodiment of the LC composite element according to the present invention.
Figure 10:
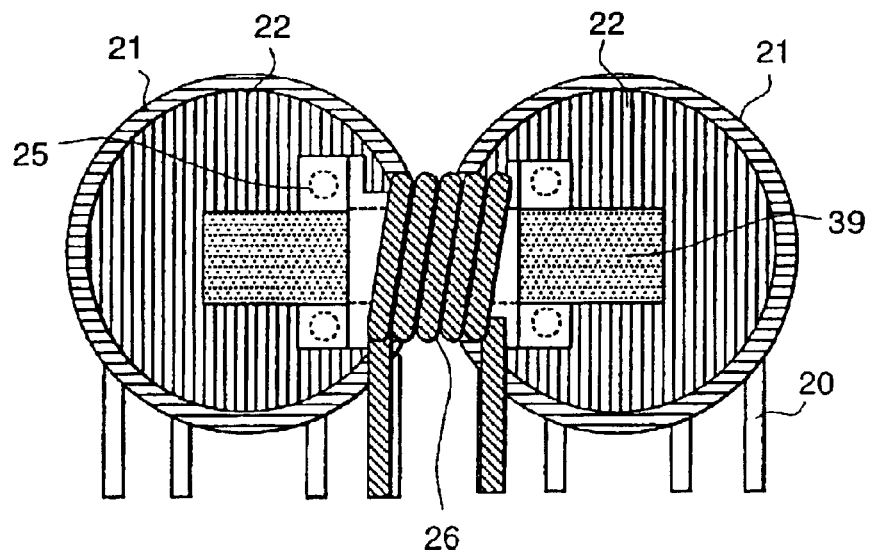
FIG. 10 is a side elevation showing the third embodiment of the LC composite element of FIG. 9.
Figure 11:
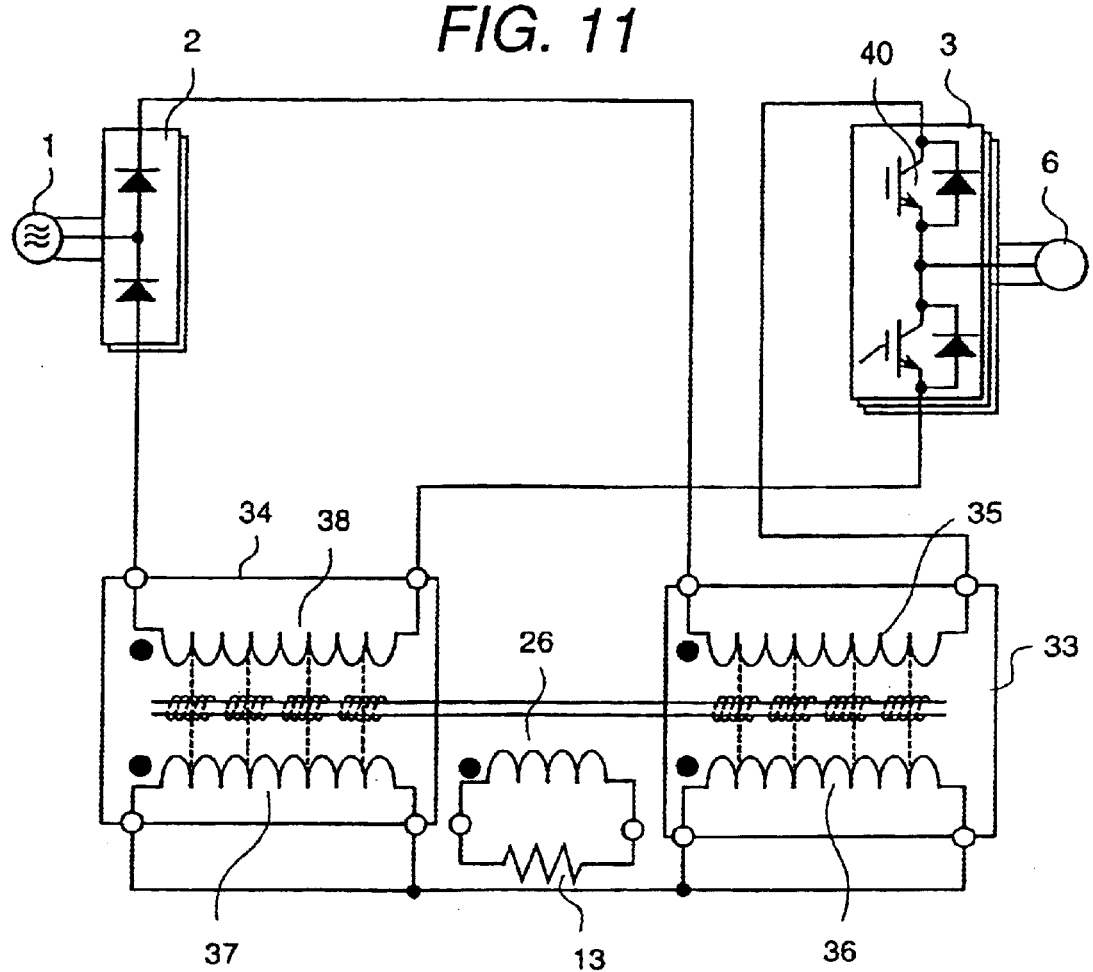
FIG. 11 is a circuit diagram showing a main circuit of the electric power converter employing the third embodiment of the LC composite element shown in FIG. 9.

FIG. 9 shows one example of a section of the third embodiment of the LC composite element according to the present invention, FIG. 10 is a side elevation of the LC composite element shown in FIG. 9 and FIG. 11 shows one example of the construction of the electric power converter employing the shown embodiment of the LC composite element. The shown embodiment is differentiated from the embodiment shown in FIGS. 1 and 7 in the following points. As shown in FIG. 11, a first LC composite element 33 and a second LC composite element 34 respectively serving as smoothing capacitor are disposed in the power wiring connecting the inverter 3, the converter 2 and the power storage portion 14. The first LC composite element 33 is located on positive side of the direct-current power and the second LC composite element 34 is located on negative side of the direct-current power. Similar to FIG. 5, an anode 35 and a cathode 36 of the first LC composite element 33 are secured on an insulation paper 18 or an insulation paper 18 wetting by electrolytic solution having a dielectric constant at least greater than air. The anode 35 and the cathode 36 are wound on the bar-shaped magnetic body 19, such as ferrite or the like having axial length at least greater than the width of the insulation paper 18 with placing the anode 35 on upper side to form a capacitor. The connecting electrodes 20 are fixed for external connection of both ends of the anode 35 and the cathode 36. The capacitor is disposed in the both end opened cylindrical casing 21. Then, seal plates 22 formed of a resin or the like are fixed on both ends of the cylindrical casing 21. Through holes are formed in the seal plate so that the connection electrode 20 and the bar-shaped magnetic body 19 may extend outside of the cylindrical casing. An anode 37 and a cathode 38 of the second LC composite elements 34 are wound on the bar-shaped magnetic body 19 with placing the cathode 38 upper side opposite to the anode 35 and the cathode 36 of the first LC composite element 33. Respective bar-shaped magnetic bodies 19 of the first and second LC component elements are connected by two connecting magnetic bodies 39 provided outside of the cylindrical casing 21 to form toroidal magnetic circuit. By connecting the cathode 36 of the first LC composite element 33 and the anode 37 of the second LC composite element 34, the first and second LC composite elements 33 and 34 are connected in series. The coil bobbin 25 is mounted one of the connecting magnetic bodies 29 located outside of the cylindrical casing 21. On the coil bobbin 25, the third coil serving as the zero-phase coil 26 is wound. The coil bobbin 25 is secured at a portion of the LC composite element 15 for shorting the output of the zero-phase coil 26 to the resistor 13 having predetermined resistance. With the construction set forth above, the resistor 13 can be inserted in the path of the common mode leakage current flowing across the inverter 3, the converter 2 and the power storage portion 14 for damping the leakage current 8. Furthermore, upon series connection of the LC composite element 15, the second LC composite element 34 having order of winding of the anode 37 and the cathode 38 opposite to that of the anode 35 and the cathode 36 of the first LC composite element 33. Thus, the position of the anode 35 of the first LC composite element 33 to be a positive side potential of the direct-current power and the cathode of the second LC composite element 34 to be a negative side potential of the direct-current power are located at symmetrical position relative to the bar-shaped magnetic body 19 to permit lowering of error magnetic flux due to offset of the electrode positions. Thus, high precision common mode transformer can be formed. b Also, it can prevent heating or breakage of the resistor 13 by the erroneously detected common mode current (leakage current) to permit only leakage current 8 from the leakage capacitance 7 of the electric power converter and the load 6 to flow through the zero-phase coil 26 to significantly reduce the leakage current 8 flowing into the power line and to reduce leakage current 8 flowing into other equipment via the commercial alternating-current power source 1 to reduce adverse effect for other equipment possibly cause malfunction. Therefore, the leakage current 8 can be damped without newly using the line filter 5 with built-in common mode transformer to achieve lowering of noise, down-sizing and lowering of cost of the electric power converter.

Figure 12:
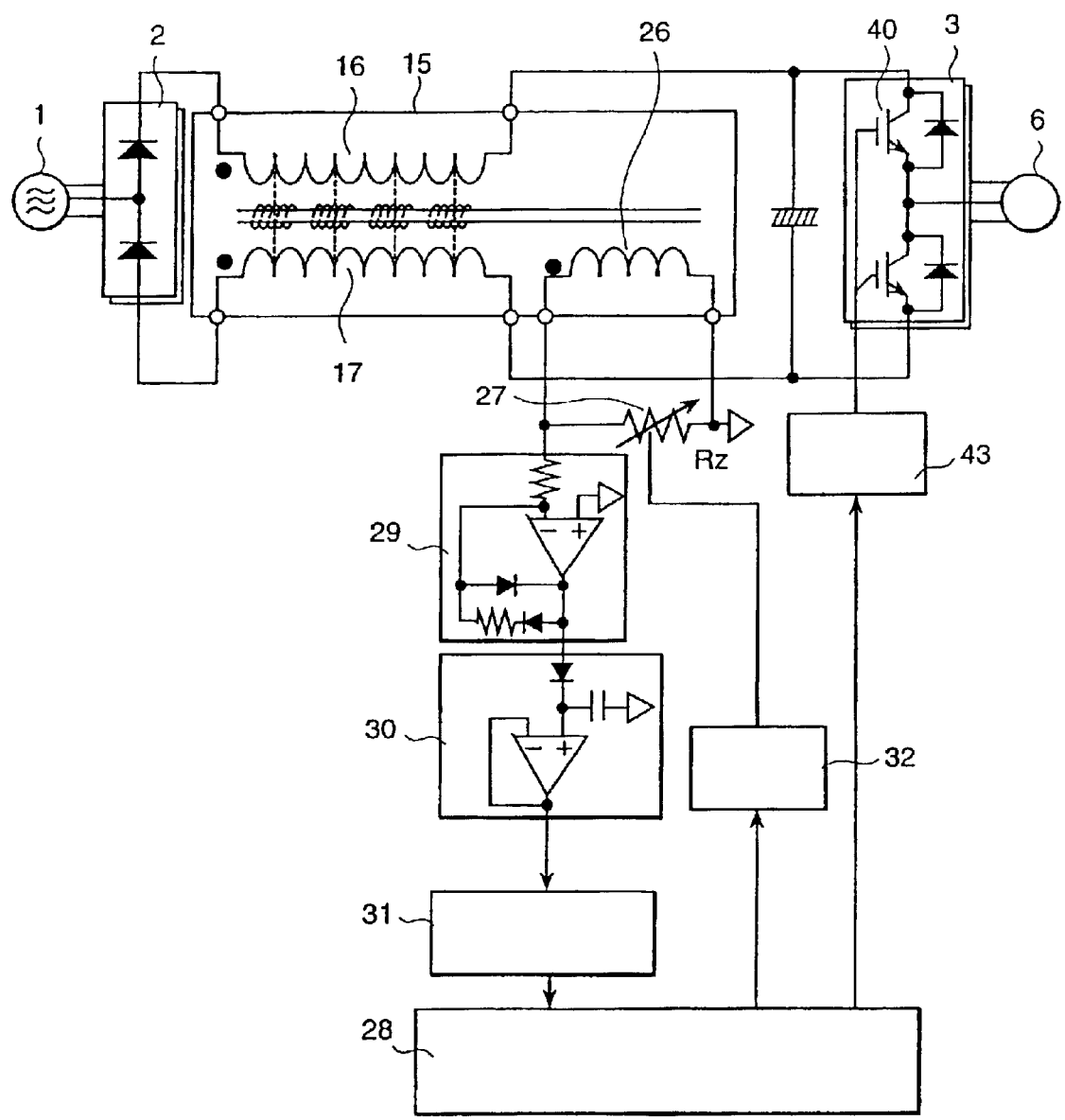
FIG. 12 is a circuit diagram showing a main circuit of the electric power converter employing the fourth embodiment of the LC composite element according to the present invention.

FIG. 12 shows one embodiment of the electric power converter employing the fourth embodiment of the LC composite element according to the present invention. The shown embodiment is differentiated from the embodiment shown in FIGS. 1 and 7 in the following points. On the electrode of inverter portion 3 side of the anode 16 and the cathode 17 of the LC composite element 15 connected to the direct-current power line or on the side of the converter portion 2 and the power storage portion 14, a typical smoothing capacitor 4 is connected in parallel to the LC composite element 15. The output of the third coil serving as the zero-phase coil 26 is shorted by the resistor 13 or the variable resistor 27. By inserting the resistor 13 or the variable resistor 27 and by setting the resistance value so that the leakage current 8 becomes minimum, damping of the leakage current becomes possible. By connecting the smoothing capacitor 5 in parallel to the LC composite element 15, the leakage current 8 flowing through the power line can be reduced significantly with easily increasing capacity of the smoothing capacitor to reduce the leakage current 8 flowing into other equipment via the commercial alternating-current power source 1. Also, electromagnetic wave generated by the leakage current 8 and the wiring voltage of the leakage current path can be reduced. Therefore, the leakage current 8 can be damped without newly using the line filter 5 with built-in common mode transformer 9 to achieve lowering of noise, down-sizing and lowering of cost of the electric power converter.

Figure 13:
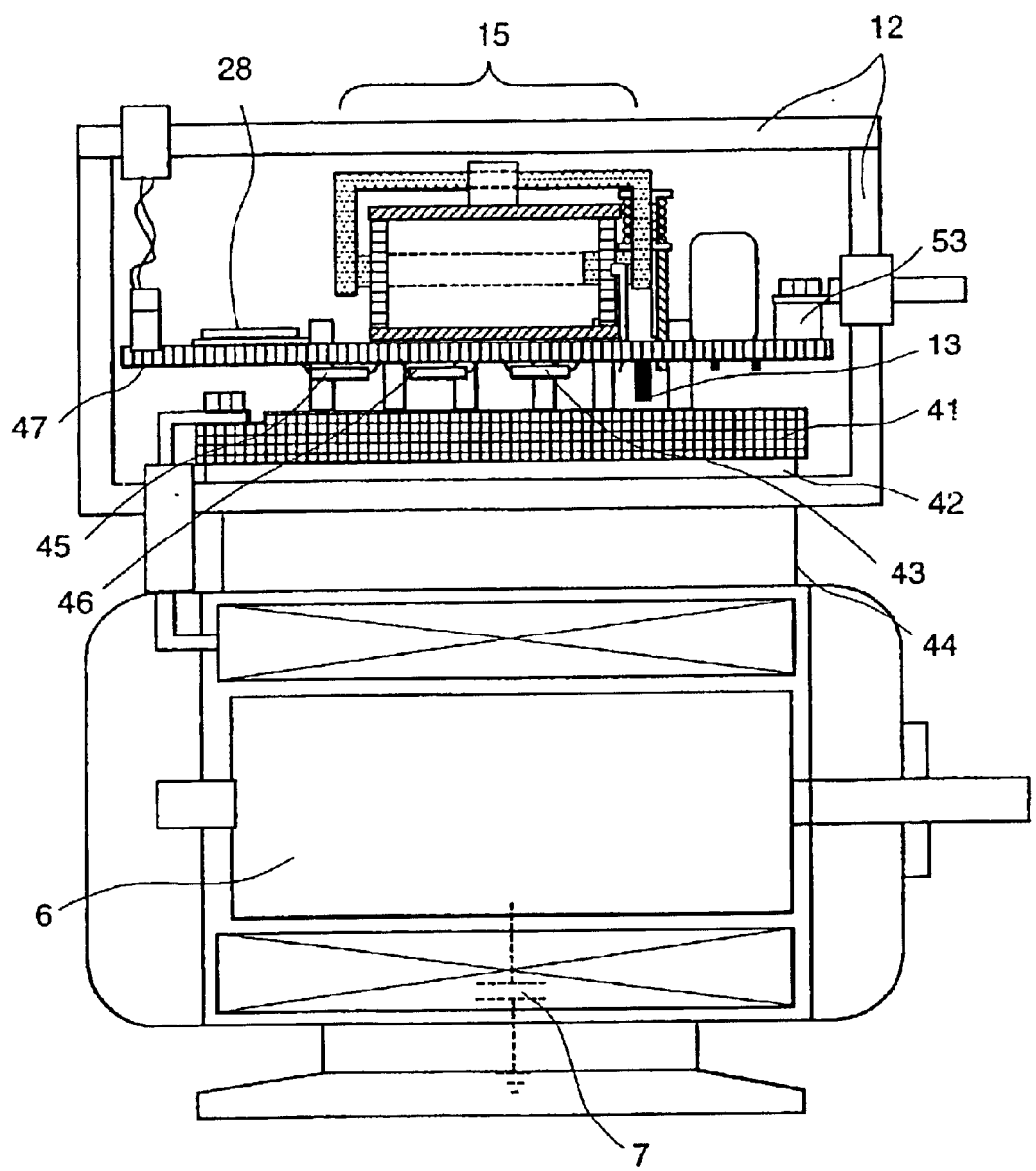
FIG. 13 is a fragmentary illustration showing the electric power converter employing the fifth embodiment of the LC composite element according to the present invention.

FIG. 13 shows one embodiment of the electric power converter employing the fifth embodiment of the LC composite element according to the present invention. The shown embodiment is differentiated from the former embodiment. As shown in FIG. 13, a power module 41 incorporating a semiconductor switching element 40 for the inverter portion 3 and the converter portion 2 is housed within an outer casing 12 of the electric power converter formed of aluminum die-cast as shown in FIG. 13. A cooler 42 of the power module 41 is fixed to the outer casing 12 by means of threaded fasteners and so forth. In the upper portion of the power module 41, the LC composite element 15, a terminal base 53, a driver circuit 43 controlling a power semiconductor, the computer 28 performing PWM control, a communication circuit 45 transferring the signal from the superior controller of the electric power converter to the computer 28, and a control board 47, on which a power source circuit 46 is mounted, are arranged to form the electric power converter by connecting with the electrode of the power module 41 by solder or the like. The outer casing 12 and an outer casing of the alternating-current motor as the load 6 are integrated. Upon integration, the outer casing 12 and the outer casing 44 may be combined and fixed by screws or bolts. When the alternating-current motor as the load 6 and the electric power converter are located in close proximity with each other, length of an output power wiring connecting the inverter portion 3 generating the leakage current 8 and the load 6 can be maintained constant under all mounting conditions. As a result, variation of the leakage current 8 depending upon mounting condition can be eliminated. Therefore, the shorting resistor 13 of the zero-phase coil 26 for minimizing the leakage current 8 can be determined univocally on the basis of the leakage capacitance of the alternating-current motor to accurately realize damping effect of the leakage current 8. With the arrangement set forth above, the leakage current 8 flowing through the power line can be reduced to eliminate adverse effect to other equipment which can cause malfunction. Also, electromagnetic wave generated by the leakage current 8 and the wiring voltage of the leakage current path can be reduced. Therefore, the leakage current 8 can be damped without newly using the line filter 5 with built-in common mode transformer 9 to achieve lowering of noise, down-sizing and lowering of cost of the electric power converter.

Figure 18:
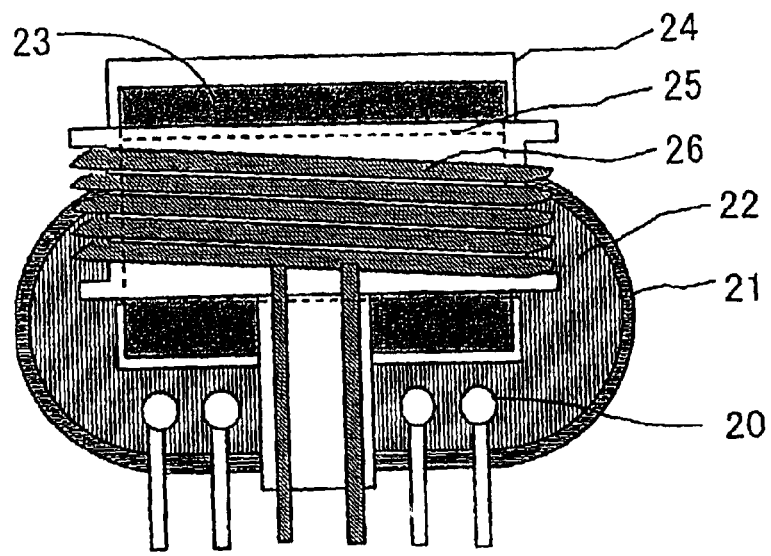
FIG. 18 is a section showing the embodiment of the electric power converter employing the sixth embodiment of the LC composite element according to the present invention.

FIG. 18 shows one example of the electric power converter employing the sixth embodiment of the LC composite element according to the present invention. The shown embodiment is differentiated from the embodiment shown in FIGS. 1 and 2 in the following points. Each electrode of the LC composite element 15 connected to the direct-current power line is wound into compressed planular shape to form the section of the wound electrodes in a plane perpendicular to a winding axis into elliptic shape. Furthermore, the magnetic body to be inserted into the center of the electrode is formed into a toroidal shape to form the magnetic circuit. Also, a section of the magnetic body in a plane perpendicular to the winding axis is formed into elliptic or rectangular shape. Thus, an effective sectional area of a magnetic path of the bar shaped magnetic body 19 can be significantly increased without significantly increasing effective magnetic path length of the magnetic circuit formed into toroidal shape to increase excitation inductance of CMT and to improve damping effect of the leakage current 8 of the zero-phase coil 26, the resistor 13 or the variable resistor 27. Thus, the leakage current 8 flowing through the power line can be reduced significantly to eliminate adverse effect to other equipment which can cause malfunction. Also, electromagnetic wave generated by the leakage current 8 and the wiring voltage of the leakage current path can be reduced. Therefore, the leakage current 8 can be damped without newly using the line filter 5 with built-in common mode transformer 9 to achieve lowering of noise, down-sizing and lowering of cost of the electric power converter.

Figure 19:
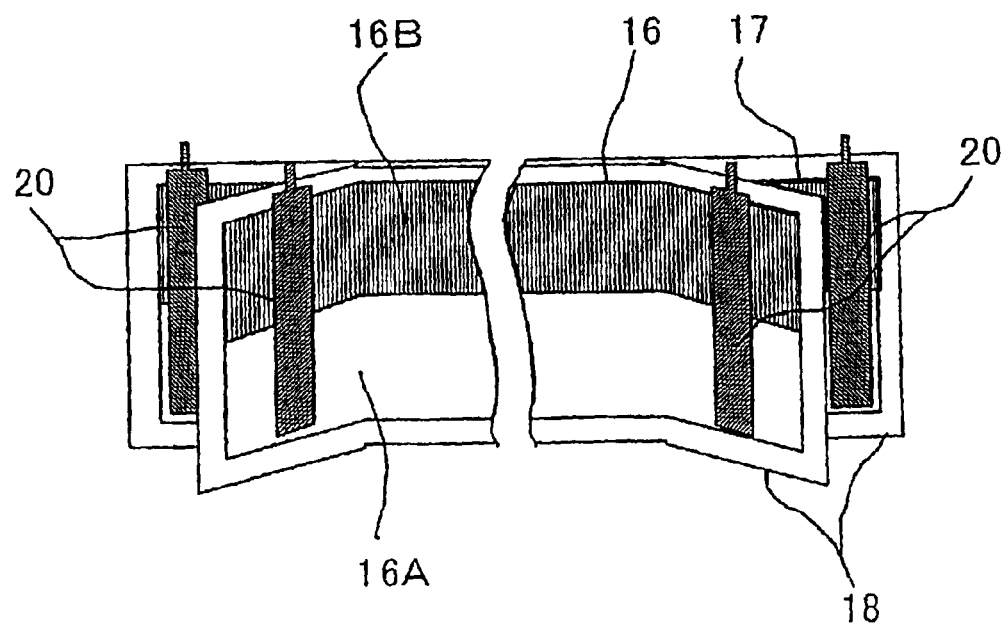
FIG. 19 is an illustration showing the embodiment of the electric power converter employing the seventh embodiment of the LC composite element according to the present invention.

FIG. 19 shows one embodiment of the electric power converter employing the seventh embodiment of the LC composite element according to the present invention. The shown embodiment is differentiated from the former embodiment. On the surfaces of the anode and the cathode 16 and 17 of the LC composite element are provided regions having mutually different surface roughness. The regions are provided in strip like form for connecting respective two connection electrodes 20 connected to anodes and cathodes, respectively. By this, an electrical resistance of the region having lower surface roughness on the surface, is lowered to restrict heating to reduce internal heat generation in the LC composite element. On the other hand, in the region 16B having large surface roughness in the surface, electric capacity can be increased to increase capacity of the LC composite element to permit formation of the LC composite element with low heat generation and high capacity. Thus, lowering of noise, lowering of loss and enhancing conversion efficiency of the electric power converter can be achieved.

Figure 14:
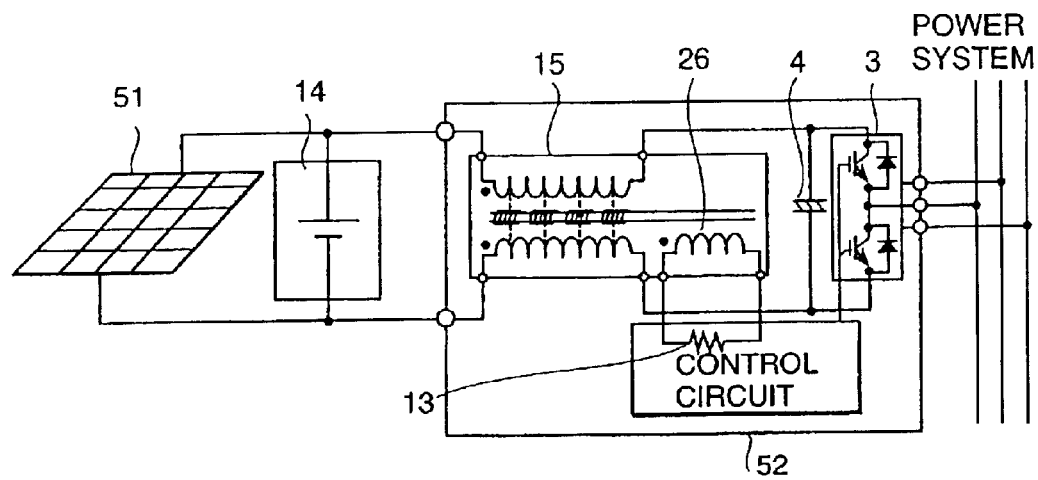
FIG. 14 is a schematic circuit diagram showing the electric power converter employing the LC composite element according to the present invention.
Figure 15:
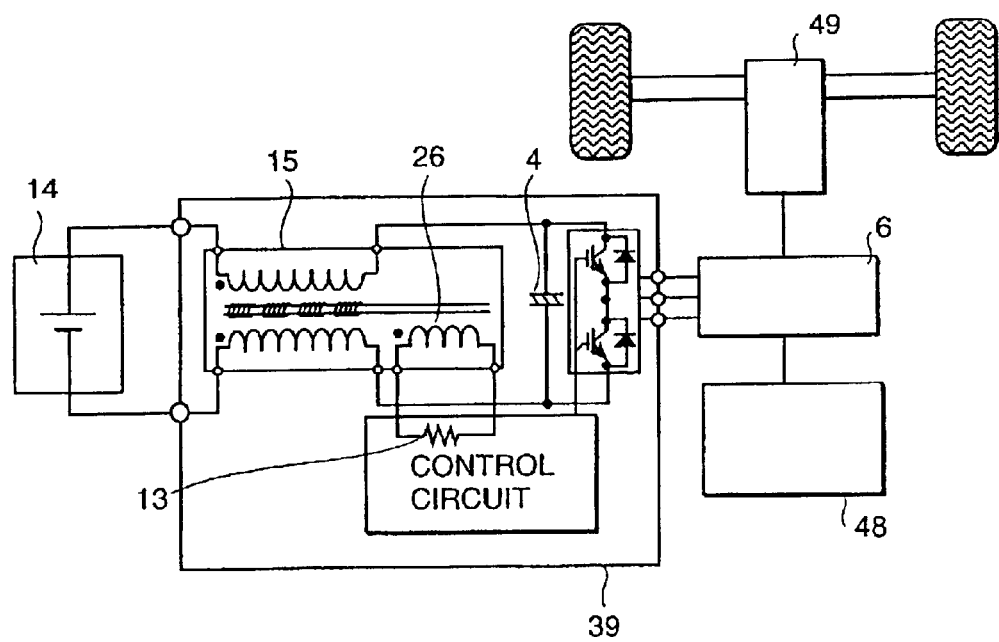
FIG. 15 is a schematic circuit diagram showing the electric power converter employing the LC composite element according to the present invention.

Naturally, the present invention is applicable as the electric power converter 52 for linking a power source system of a photo voltaic power generation system constructed with solar cell 51 and the electric power converter as shown in FIG. 14, all vehicles and all inverter units mounted on the vehicles taking an internal combustion engine 48 and an electric motor as the load 6 as prime mover, connecting the power storage portion 14 to the inverter portion 3 via the LC composite element 15 for supplying direct-current power, transmitting driving torque of the internal combustion engine 48 and the electric motor of the load 6 through a power transmission 49, as shown in FIG. 15. Furthermore, the foregoing embodiments of the electric power converter is applicable for the inverter unit for driving a compressor or fan motor to be employed in home-use or business-use air conditioner or for the inductance driving electric power converter for a motor driving washing bath of washing machine, a motor of a suction fan of electric cleaner, for generating magnetic field of electromagnetic range and so forth, to achieve lowering of noise, down-sizing and lowering of cost.

As set forth above, with the present invention, electric power converter which can achieve lowering of noise, down-sizing and lowering of cost, can be provided, by winding the anode and the cathode of the capacitor on the bar-shaped magnetic body, leading the connection electrode from both ends of the anode and the cathode, and using the connecting magnetic body linking both end of the bar-shaped magnetic body to form the magnetic circuit, and employing the LC composite element having the third coil interlinked with the magnetic circuit.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. An electric power converter including a capacitor disposed in a power wiring for supplying an electric power to a load, comprising:

a foil form first electrode fixed on a first insulation sheet;

a foil form second electrode fixed on a second insulation sheet;

a bar-shaped first magnetic body, on which said first electrode with said first insulation sheet and said second electrode with said second insulation sheet are wound in overlapping manner to form an LC composite element;

connecting electrodes electrically connected to respective of both ends of said first and second electrodes;

a second magnetic body having both ends located in contact with or close proximity with both ends of said first magnetic body for interlinking both ends of said first magnetic body;

a coil wound around said second magnetic body in the same winding direction as said first and second electrodes wound around said first magnetic body; and a resistor for shorting the output of said coil.

2. An electric power converter as set forth in claim 1, which further comprises:

a both end opened cylindrical casing, in which said LC composite element is disposed;

seal plates formed of insulation material, fixed on both ends of said cylindrical casing for closing said both end opening, and defining through openings, through which said connecting electrode and first magnetic body extend;

said second magnetic body being arranged on outside of said cylindrical casing linking both ends of said first magnetic body and being fixed side surface of said cylindrical casing and said seal plate by a jig or adhesive.

3. An electric power converter as set forth in claim 2, wherein a jig for fixing said second magnetic body and fixing said LC composite element on a wiring board, is secured on said cylindrical casing.

4. An electric power converter as set forth in claim 2, wherein a jig for fixing said second magnetic body and fixing said LC composite element on a wiring board, is secured on said seal plate.

* * * * *